April 23, 1963 W. DILLEY 3,086,499
WIND ORIENTED MARAUDER-PROOF BIRD FEEDER
Filed Jan. 13, 1961 2 Sheets-Sheet 2
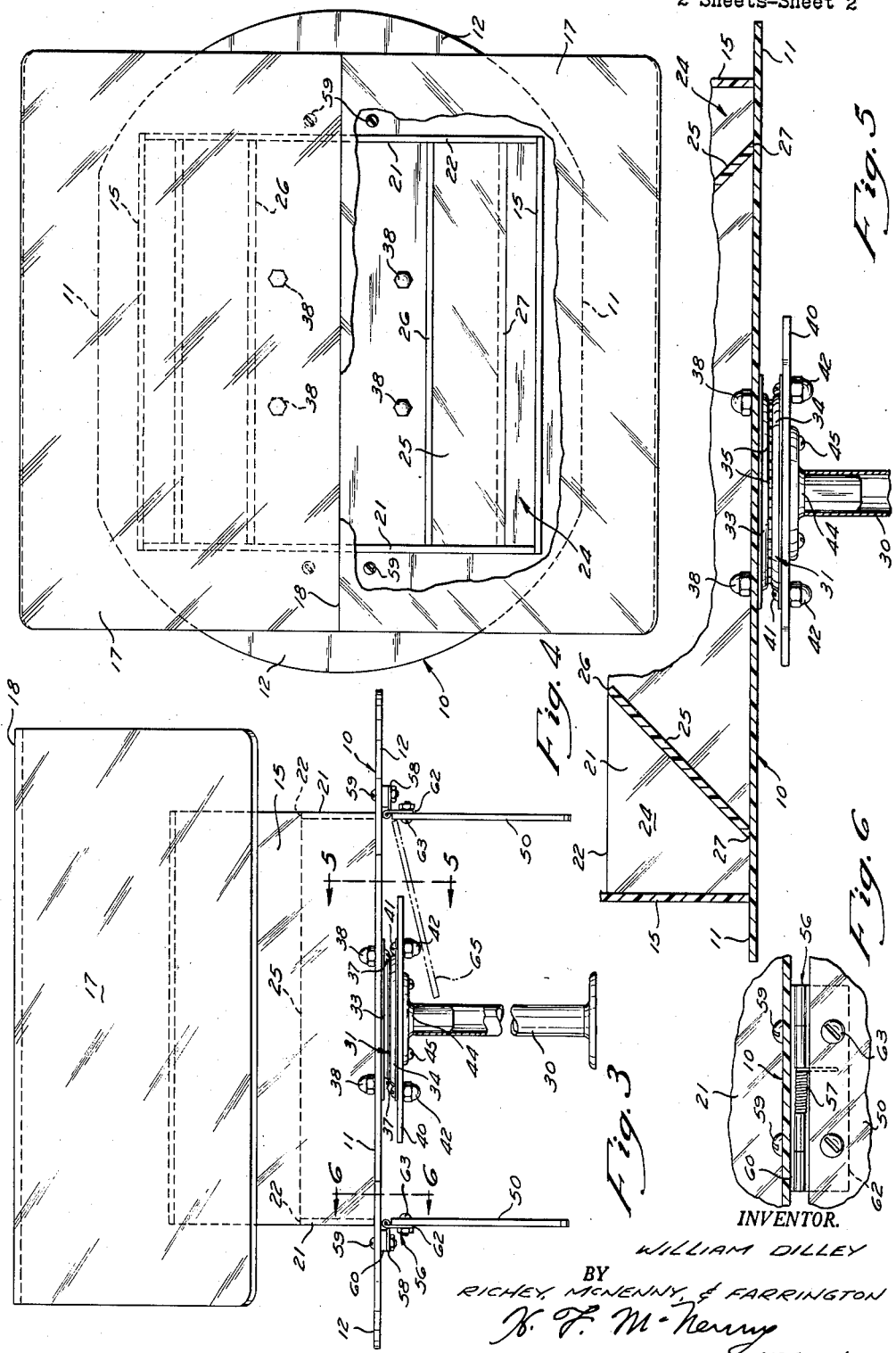
INVENTOR.
WILLIAM DILLEY
BY
RICHEY, McNENNY, & FARRINGTON
ATTORNEYS

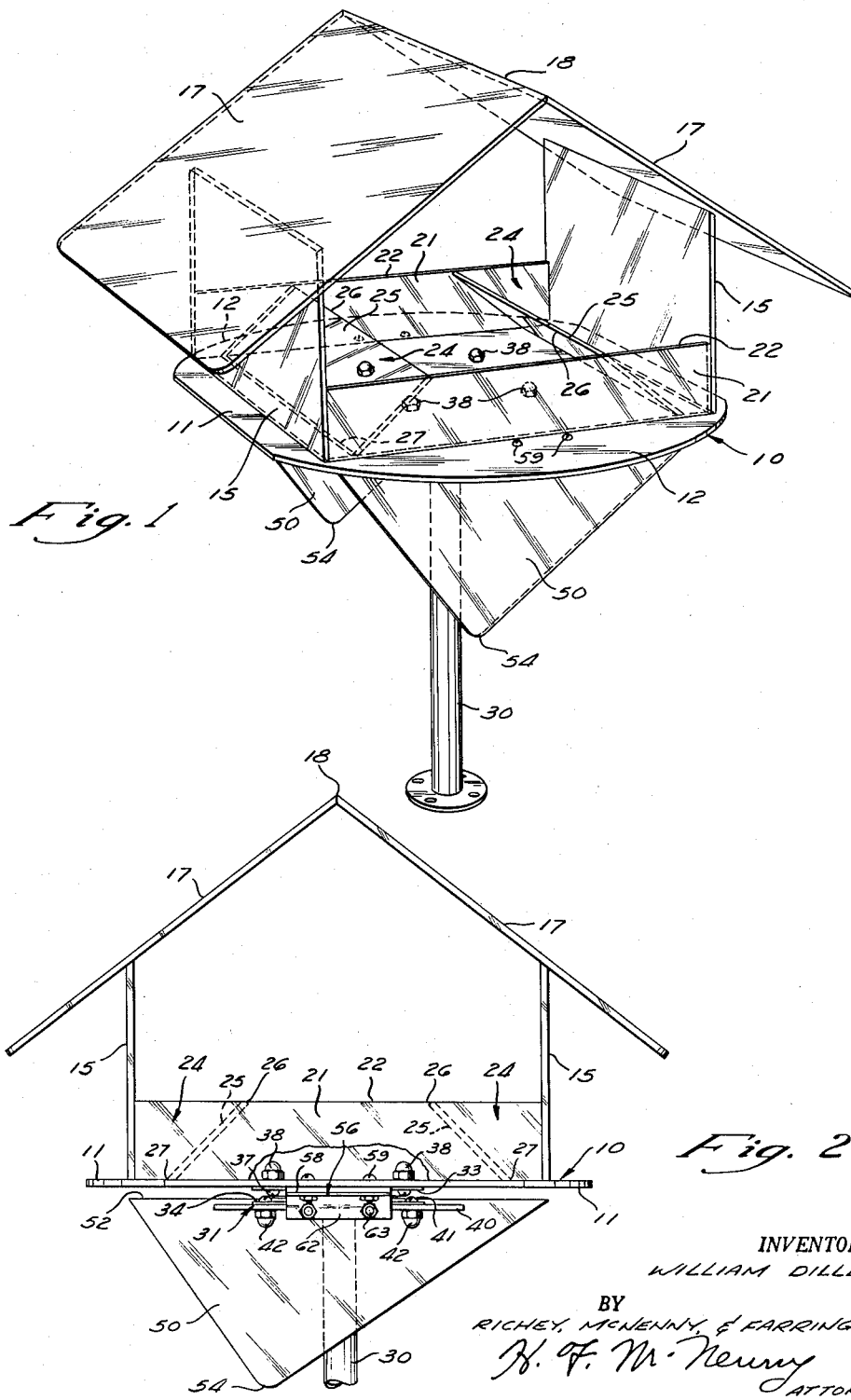

United States Patent Office 3,086,499
Patented Apr. 23, 1963

3,086,499
WIND ORIENTED MARAUDER-PROOF
BIRD FEEDER
William Dilley, 6039 Ridgebury Blvd.,
Mayfield Village 24, Ohio
Filed Jan. 13, 1961, Ser. No. 82,543
9 Claims. (Cl. 119—51)

This invention relates generally to feeding stations for wild birds of the type adapted to be placed in gardens and lawns to attract and permit observation of song birds and the like.

It is a principal object of this invention to provide a novel bird feeder which permits clear visibility of birds feeding within the feeder from substantially any direction and which also allows the birds within the feeder to observe their surroundings and the approach of enemies or undesirable birds.

It is another object of this invention to provide a novel bird feeder adaptable to swivel and orient itself with respect to the wind to reduce the feed being blown out of the feeder and to protect the feeding birds within the feeder from exposure to the wind.

It is another object of this invention to provide a bird feeder in accordance with the preceding object which is directionally sensitive and highly responsive to winds of very low velocity.

It is another object of this invention to provide a bird feeder in accordance with the preceding objects which provides easy access for entry and departure by the birds with the choice of two opposite directions.

It is still another object of this invention to provide a bird feeder in accordance with the preceding objects in which access to the feeder is difficult for animal pests and enemies of the birds such as cats and the like.

It is still another object of this invention to provide a bird feeder of the type characterized above which reduces waste of the feed and reduces the spillage of feed onto the surrounding area of ground around the feeder.

It is still another object of this invention to provide a bird feeder of the type described above which is partially collapsible into a smaller package for shipping and storage purposes without requiring disassembly and reassembly of any of the parts of the feeder.

Among the other objects of this invention are to provide a bird feeder of the character described above which is simple and rugged in construction, while remaining easy to clean and providing an attractive and ornamental appearance of decorative value when placed in the lawns and gardens around homes.

Further features and advantages of the invention will become apparent from the detailed description of the preferred embodiment of the bird feeder as shown in the accompanying drawings in which:

FIG. 1 is a perspective view of the bird feeder of the present invention;

FIG. 2 is an end elevational view of the bird feeder;

FIG. 3 is a side elevational view;

FIG. 4 is a top plan view;

FIG. 5 is a fragmentary cross-sectional view with parts broken away taken on line 5—5 of FIG. 3; and FIG. 6 is an enlarged fragmentary cross-sectional view taken on line 6—6 of FIG. 3.

The main structural portions of the bird feeder comprise panels formed preferably from transparent highly polished sheet material such as acrylic plastic or the like. The joints between the panel members are preferably formed by cementing or using a plastic solvent to weld the members together, although it is well understood that other methods of joining the panels can be employed. The feeder has a base or platform member 10 which unlike the other plastic panels is preferably made opaque to provide a contrasting background when observing the birds within the feeder and to provide a feeling of security for the birds. The platform 10 is roughly oval in shape having side portions 11 and rounded end portions 12 serving as a landing platform or perch for the incoming or outgoing birds.

Side wall panels 15 of transparent material are attached to the base 10 along the side portions 11 a short distance inward from the edges and extend perpendicularly upward. A pair of roof panels 17 form a gable roof and are joined together along a peak or ridge 18 extending parallel to the side walls 15. The roof panels 17 extend downward and are cemented or welded to the upper edges of the side walls 15. It should be noted that the roof panels 17 extend both lengthwise and downwardly beyond the side walls 15 to overhang and cover substantially all of the platform 10.

End walls 21 extend between the side walls 15 at each end and project upward from the base or platform member 10 to terminate in a top edge 22 a short distance above the base. The open space above the end walls 21 is relatively large to allow free access to the interior of the feeder. Feed troughs 24 are formed along the inside of each of the side walls 15 by trough panels or walls 25 which extend lengthwise between the end walls 21. The upper edge 26 of the trough walls is coplanar with the top edges 22 of the end walls 21, and the trough panels 25 slant downwardly outwardly toward the side walls 15 to terminate at their bottom edges 27 at the platform 10 a spaced distance inward from side walls 15. This construction of the troughs 24 provides a capacity for a considerable amount of feed while still allowing space between the troughs in the center of the platform 10 for the birds to perch while feeding. Since the bottom edge 27 of the trough panels is spaced away from the side walls 15, the bottom portions of the troughs are flat and exposed to allow the troughs to be easily cleaned.

The bird feeder is mounted on a suitable pole or post 30 by a swivel bearing assembly indicated at 31. The swivel bearing 31 is of the anti-friction ball thrust type and includes upper and lower bearing race plates 33 and 34, respectively, between which are located a full complement of balls 35. The bearing plates 33 and 34 are also interconnected in a suitable manner such as by interlocking flanges to prevent axial separation of the plates, as is well known in the bearing art. The upper bearing plate 33 is centrally positioned on the underside of the platform 10 and secured in place by means of screws 37 and nuts 38. The lower bearing plate 34 is likewise secured to a mounting plate 40, which may also be formed from the sheet plastic material, by means of screws 41 and nuts 42. A suitable adapter fitting 44 is fastened to the underside of mounting plate 40 by means of screws 45 and fits within the pole or post 30 to position the feeder thereon.

In order to orient the bird feeder with respect to the prevailing direction of the wind, a pair of fins or vanes 50 are secured to the under side of the platform 10 and extend parallel to and directly beneath the end walls 21. The fins or vanes 50 are triangular in shape having an upper edge 52 extending parallel to the platform 10 and having apexes 54 projecting downwardly. It will be noted that both of the apexes 54 are positioned to one side of the center line of the bird feeder so that the fins will present a greater area to the wind on that side. This construction provides greater stability and sensitivity to wind direction for the feeder, and the feeder tends to rotate so that the apexes 54 are away from the direction of the wind. Each of the fins or vanes 50 is secured to the platform 10 by a spring hinge 56. The hinge 56 has one hinge plate 58 secured by means of suitable screws and nuts 59 to the bottom side of the platform 10. A spacer plate 60 is interposed between the hinge plate 58 and the platform 10 for clearance purposes. The other hinge plate 62 is secured by suitable screws and nuts 63 to the fin or vane 50 along its upper edge 52. A torsion spring 57 biases the hinge plates 58 and 62 in a direction tending to maintain the fins or vanes 50 substantially perpendicular to the platform 10. However, the action of the spring hinges allows the fins or vanes 50 to be folded inwardly toward the swivel bearing 31 to assume the position indicated in broken lines at 65 to reduce the overall size of the bird feeder for shipping or storage purposes.

Because of the relatively large area of the fins or vanes 50 and the relatively low friction of the swivel bearing 31, the bird feeder will turn in even a very light wind so that the vanes are parallel to the wind, usually with the vane apexes on the side away from the wind. The birds have access from either of the open ends of the feeder above the end walls 21 and when they are within the feeder they will face either of the troughs 24 and therefore be positioned entirely within the feeder facing one or the other of the side walls 15. The feeder may be built of such a size to hold a number of smaller birds or several larger birds, and when the birds are feeding, they are entirely protected by the side walls 15 so that even the largest birds are completely shielded from the wind. When the birds desire to leave the feeder they can turn to either of the open ends and have sufficient space to spread their wings before they are completely out of the feeder. Because of the generous access openings provided at the ends of the feeder, it is possible for smaller birds to fly straight through the feeder or else come in to perch directly at the troughs 24 without first landing on the end portions 12 of the platform, as it generally necessary for larger birds.

Several features of the feeder make it generally unattractive for animal pests such as cats and squirrels. The only manner in which a squirrel or cat can reach the feeder is to climb the pole 30. Since the pole 30 is preferably made of metal and has a smooth surface without gripping places for claws, the animals must shinny up the pole and then reach out to obtain a hold on the platform 10 to raise themselves upwards to reach the feed within the troughs 24. Since the platform 10 extends radially outward for a considerable distance from the pole 30, the animal must either have an extremely long reach or else reach for the fins or vanes 50. When the animal tries to do the latter, the fins or vanes will fold at the spring hinge 56, since the force of the hinge spring 57 is relatively light. This spring-loaded folding action of the fins or vanes 50 prevents the animal from getting a firm grip on the fin and tends to deter further efforts toward climbing on the top of the platform 10. Furthermore, if the animal is able to reach a position on top of platform 10, the low friction of the swivel bearing 31 will allow the feeder to turn from the reactive force resulting from the movements of the animal. This unreliable footing will generally discourage the animal from further effects in raiding the bird feeder.

Since all of the superstructure of the feeder is formed from transparent plastic panels, the birds within the feeder may be seen by observers from any angle above the platform 10. Likewise, the birds can see outward through the transparent panels and therefore watch the approach of other birds coming to the feeder. The relatively large openings in the ends of the feeder allow easy access for the hands for cleaning purposes when it is desired to clean out the feeder. Since all of the surfaces of the various feeder panels are open and accessible, they may be easily washed and dried without any disassembly of the feeder or the use of any special cleaning tools or brushes.

Although only one form of the bird feeder of this invention has been shown in the drawings and described in detail hereinabove, it will be readily understood that various modifications and rearrangements may be made in the structure of the bird feeder without departing from the scope of the invention which is defined in the following claims.

What is claimed is:

1. A bird feeder comprising a platform, side walls extending upward from said platform, a roof covering the space enclosed by said walls, said walls providing an opening to permit birds to enter the interior of the feeder, mounting means below said platform, swivel bearing means interconnecting said mounting means and said platform, a pair of parallel spaced triangular vanes extending downward below said platform, one vane on each side of said swivel bearing means, the apexes of said vanes being spaced laterally to one side of said bearing means, and a spring hinge connecting each vane to said platform, said spring hinges biasing said vanes to a position perpendicular to said platform, said spring hinges permitting said vanes to fold inward toward said swivel bearing means.

2. A bird feeder comprising a platform, a pair of parallel spaced vertical side walls extending perpendicularly upward from said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending between said side walls perpendicular to said platform, said end walls extending upward from said platform a spaced distance less than the height of said side walls, a pair of trough walls each extending between said end walls, said trough walls extending downward and outward toward said platform, mounting means below said platform, swivel bearing means interconnecting said mounting means and said platform, and a pair of parallel spaced vanes extending downward below said platform parallel to said end walls, one vane on each side of said swivel bearing means.

3. A bird feeder comprising a platform, a pair of parallel spaced vertical side walls extending perpendicularly upward from said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending transversely between said side walls, said end walls extending upward from said platform a spaced distance less than the height of said side walls, a pair of trough walls each extending between said end walls, said trough walls extending downward and outward toward said platform, mounting means below said platform, swivel bearing means interconnecting said mounting means and said platform, a pair of vanes extending downward below said platform parallel to said end walls, one vane on each side of said swivel bearing means, and a spring hinge connecting each vane to said platform, said spring hinge biasing said vane to a position perpendicular to said platform, said spring hinges permitting said vanes to fold inward toward said swivel bearing means.

4. A bird feeder comprising a platform, a pair of parallel spaced vertical side walls extending perpendicularly upward from said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending between said side walls perpendicular to said platform, said end walls extending upward from said platform a spaced distance less than the height of said side walls, a pair of trough walls each extending between said end walls and having an upper edge coplanar with the upper edge of said end walls, said trough walls extending downward and outward to join said platform a spaced distance inward of said side walls, mounting means below said platform, swivel bearing means interconnecting said mounting means and said platform, a pair of parallel spaced vanes extending downward below said platform parallel to said end walls, one vane on each side of said swivel bearing means, and a hinge connecting each vane to said platform, said hinges permitting said vanes to fold inward toward said swivel bearing means.

5. A bird feeder comprising a platform, a pair of parallel spaced vertical side walls extending perpendicularly upward from said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending between said side walls perpendicular to said platform, said end walls extending upward from said platform a spaced distance less than the height of said side walls, a pair of trough walls each extending between said end walls and having an upper edge coplanar with the upper edge of said end walls, said trough walls extending downward and outward to join said platform a spaced distance inward of said side walls, mounting means below said platform, anti-friction swivel bearing means interconnecting said mounting means and said platform, a pair of parallel spaced triangular vanes extending downward below said platform, one vane coplanar with each end wall, the apexes of said vanes being closer to one side wall than to the other, and a spring hinge connecting each vane to said platform, said spring hinge biasing said vane to a position perpendicular to said platform, said spring hinges permitting said vanes to fold inward toward said swivel bearing means.

6. A bird feeder comprising a platform of opaque material, a pair of parallel spaced vertical side walls of transparent material extending perpendicularly upward from said platform, a pair of transparent roof panels joined together along a ridge parallel to said platform, said roof panels sloping downward and outward, each roof panel being joined to one of said side walls along a line parallel to said platform, a pair of parallel spaced vertical end walls of transparent material, each end wall extending between said side walls perpendicular to said platform, said end walls extending upward from said platform a spaced distance less than the height of said side walls, a pair of transparent trough walls each extending between said end walls and having an upper edge coplanar with the upper edge of said end walls, said trough walls extending downward and outward to join said platform, mounting means below said platform, swivel bearing means interconnecting said mounting means and said platform, a pair of parallel spaced vanes of transparent material extending downward below said platform parallel to said end walls, one vane on each side of said swivel bearing means, and a spring hinge connecting each vane to said platform, said spring hinges biasing said vanes to a position perpendicular to said platform, said spring hinges permitting said vanes to fold inward toward said swivel bearing means.

7. A bird feeder comprising a platform of opaque material, a pair of parallel spaced vertical side walls of transparent material extending perpendicularly upward from said platform, a pair of transparent roof panels joined together along a ridge parallel to said platform, said roof panels sloping downward and outward, each roof panel being joined to one of said side walls along a line parallel to said platform, a pair of parallel spaced vertical end walls of transparent material, each end wall extending between said side walls perpendicular to said platform, said end walls extending upward from said platform a spaced distance less than the height of said side walls, a pair of transparent trough walls each extending between said end walls and having an upper edge coplanar with the upper edge of said end walls, said trough walls extending downward and outward to join said platform a spaced distance inward of said side walls, mounting means below said platform, anti-friction swivel bearing means interconnecting said mounting means and said platform, a pair of parallel spaced triangular vanes of transparent material extending downward below said platform, one vane coplanar with each end wall, the apexes of said vanes being closer to one side wall than to the other, and a spring hinge connecting each vane to said platform, said spring hinges biasing said vanes to a position perpendicular to said platform, said spring hinges permitting said vanes to fold inward toward said anti-friction bearing means.

8. A bird feeder comprising a platform, a pair of parallel spaced vertical side walls extending perpendicularly upward from said platform a spaced distance inward from the edges of said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending between said side walls perpendicular to said platform a spaced distance inward from the edge of said platform, said end walls extending upward from said platform a spaced distance less than the height of said side walls, a pair of trough walls each extending between said end walls and having an upper edge coplanar with the upper edge of said end walls, said trough walls extending downward and outward to join said platform, mounting means below said platform, swivel bearing means interconnecting said mounting means and said platform parallel to said end walls, a pair of vanes extending downward below said platform, one vane on each side of said swivel bearing means, and a spring hinge connecting each vane to said platform, said spring hinges biasing said vanes to a position perpendicular to said platform, said spring hinges permitting said vanes to fold inward toward said anti-friction bearing means.

9. A bird feeder comprising a platform, a pair of parallel spaced vertical side walls extending perpendicularly upward from said platform a spaced distance inward from the edges of said platform, a pair of roof panels joined together along a ridge parallel to said platform, said roof panels sloping downward and outward, each roof panel being joined to one of said side walls along a line parallel to said platform, a pair of parallel spaced vertical end walls, each end wall extending between said side walls perpendicular to said platform a spaced distance inward from the edge of said platform, said end walls extending upward from said platform a spaced distance less than the height of said side walls, a pair of trough walls each extending between said end walls and having an upper edge coplanar with the upper edge of said end walls, said trough walls extending downward and outward to join said platform a spaced distance inward of said side walls, mounting means below said platform, anti-friction swivel bearing means interconnecting said mounting means and said platform, a pair of parallel spaced triangular vanes extending downward below said platform, one vane coplanar with each end wall, the apexes of said vanes being closer to one side wall than to the other, and a spring hinge connecting each vane to said platform, said spring hinges biasing said vanes to a position perpendicular to said platform, said spring hinges permitting said vanes to fold inward toward said anti-friction bearing means.

References Cited in the file of this patent

UNITED STATES PATENTS

| | | |
|---|---|---|
| D. 119,499 | Howard | Mar. 19, 1940 |
| D. 120,350 | Moore | May 7, 1940 |
| 2,349,868 | Hyde | May 30, 1944 |
| 2,524,502 | Wilkinson | Oct. 3, 1950 |
| 2,707,454 | Wilkinson | May 3, 1955 |
| 2,918,901 | Poulsen | Dec. 29, 1959 |